US012542970B2

(12) United States Patent
Cho

(10) Patent No.: US 12,542,970 B2
(45) Date of Patent: Feb. 3, 2026

(54) IMAGE SENSING DEVICE

(71) Applicant: SK hynix Inc., Icheon-si (KR)

(72) Inventor: Sung Wook Cho, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 114 days.

(21) Appl. No.: 18/408,318

(22) Filed: Jan. 9, 2024

(65) Prior Publication Data

US 2024/0323527 A1    Sep. 26, 2024

(30) Foreign Application Priority Data

Mar. 22, 2023    (KR) .................. 10-2023-0037216

(51) Int. Cl.
*H04N 23/67*    (2023.01)
*G02B 6/42*    (2006.01)
*H10F 39/00*    (2025.01)

(52) U.S. Cl.
CPC ......... *H04N 23/672* (2023.01); *G02B 6/4206* (2013.01); *H10F 39/805* (2025.01); *H10F 39/8063* (2025.01); *H10F 39/807* (2025.01)

(58) Field of Classification Search
CPC .. H04N 23/672; G02B 6/4206; H10F 39/805; H10F 39/8063; H10F 39/807; H10F 39/8053; H10F 39/8067; H10F 39/811; H10F 39/806

See application file for complete search history.

(56) References Cited

U.S. PATENT DOCUMENTS

| 10,483,309 | B1 | 11/2019 | Lee |
| 2017/0301718 | A1 | 10/2017 | Chou et al. |
| 2023/0326942 | A1* | 10/2023 | Wang .................... H10F 39/807 |
| 2024/0030252 | A1* | 1/2024 | Moriya ................... H10F 77/40 |
| 2024/0055456 | A1* | 2/2024 | Noudo ................ H10F 39/8057 |
| 2025/0052609 | A1* | 2/2025 | Goi .......................... G01J 1/44 |
| 2025/0169207 | A1* | 5/2025 | Lim ...................... H10F 39/813 |

FOREIGN PATENT DOCUMENTS

| KR | 20180085394 A | 7/2018 |
| KR | 102435449 B1 | 8/2022 |

* cited by examiner

*Primary Examiner* — Shahbaz Nazrul
(74) *Attorney, Agent, or Firm* — Perkins Coie LLP

(57) ABSTRACT

An image sensing device includes: a plurality of photoelectric conversion elements included in a unit pixel and located in a substrate layer; an isolation structure configured to isolate the plurality of photoelectric conversion elements from photoelectric conversion elements included in another unit pixel; a first anti-reflection layer configured to overlap the plurality of photoelectric conversion elements and disposed to be in contact with one surface of the substrate layer; a light guide disposed between the plurality of photoelectric conversion elements and disposed to be in contact with one surface of the substrate layer and the first anti-reflection layer; a grid layer configured to overlap the isolation structure; and a second anti-reflection layer disposed to be in contact with the first anti-reflection layer, the light guide, and the grid layer, wherein the light guide includes a material having a refractive index smaller than a refractive index of the first anti-reflection layer.

19 Claims, 17 Drawing Sheets

IMAGE SENSING DEVICE

CROSS-REFERENCE TO RELATED APPLICATION

This patent document claims the priority and benefits of Korean patent application No. 10-2023-0037216, filed on Mar. 22, 2023, the disclosure of which is incorporated by reference in its entirety as part of the disclosure of this patent document.

TECHNICAL FIELD

The technology and implementations disclosed in this patent document generally relate to an image sensing device, and more particularly to an image sensor capable of performing a phase-difference detection autofocus (PDAF) function.

BACKGROUND

An image sensing device is a device for capturing optical images by converting light into electrical signals using a photosensitive semiconductive material which reacts to light. With the development of automotive, medical, computer and communication industries, the demand for high-performance image sensing devices is increasing in various fields such as smart phones, digital cameras, game machines, IoT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an image sensing device including a light guide unit for dividing incident light into a plurality of light beams to be transferred to a plurality of photoelectric conversion elements. Since the image sensing device includes the light guide unit, the image sensing device can control the amount of light to be transmitted to a plurality of photoelectric conversion elements using the light guide unit.

Various embodiments of the disclosed technology relate to an image sensing device including a light guide unit without forming an isolation structure between photoelectric conversion elements included in a unit pixel, such that the image sensing device can easily guide incident light while increasing light reception efficiency of a unit pixel.

In accordance with an embodiment of the disclosed technology, an image sensing device is provided to comprise: a plurality of photoelectric conversion elements included in a unit pixel and located in a substrate layer, each of the plurality of photoelectric conversion elements configured to receive incident light and generate an electrical signal corresponding to the received incident light; an isolation structure disposed along an edge of the unit pixel and configured to isolate the plurality of photoelectric conversion elements from photoelectric conversion elements included in another unit pixel adjacent to the unit pixel; a first anti-reflection layer configured to overlap the plurality of photoelectric conversion elements and disposed to be in contact with one surface of the substrate layer; a light guide disposed between the plurality of photoelectric conversion elements and disposed to be in contact with one surface of the substrate layer and the first anti-reflection layer; a grid layer configured to overlap the isolation structure; and a second anti-reflection layer disposed to be in contact with the first anti-reflection layer, the light guide, and the grid layer, wherein the light guide includes a material having a refractive index smaller than a refractive index of the first anti-reflection layer.

In some implementations, the grid layer includes a plurality of layers having different refractive indices from one another.

In some implementations, the refractive index of the light guide is less than or equal to the refractive index of the grid layer.

In some implementations, the material includes air.

In some implementations, the image sensing device further comprises an optical filter layer disposed over the second anti-reflection layer.

In some implementations, the image sensing device further comprises: a microlens disposed over the optical filter layer.

In some implementations, the microlens is configured to overlap two photoelectric conversion elements.

In some implementations, the microlens is configured to overlap four photoelectric conversion elements.

In some implementations, the light guide is configured to extend from one surface of the substrate layer to the optical filter layer.

In some implementations, the isolation structure is disposed under the first anti-reflection layer without being disposed under the light guide.

In some implementations, the light guide includes a plurality of layers having different refractive indices from one another.

In some implementations, the light guide includes: a first guide layer disposed to be in contact with the substrate layer in which the plurality of photoelectric conversion elements are located; and a second guide layer disposed over the first guide layer and formed to be in contact with the second anti-reflection layer.

In some implementations, the first guide layer is configured to have a higher refractive index than a refractive index of the second guide layer.

In some implementations, the second guide layer includes a material having a lower refractive index than the refractive index of the first anti-reflection layer.

In some implementations, the light guide includes one surface contacting the substrate layer in which the plurality of photoelectric conversion elements is located, and an area of the one surface has a size different from a size of an area of another surface facing or opposite to the one surface.

In another aspect, an image sensing device is provided to comprise: a photoelectric conversion element disposed in a substrate layer and included in a unit pixel, the photoelectric conversion element configured to receive light incident on the unit pixel and generate an electrical signal corresponding to an incident light; an isolation structure disposed at a side of the photoelectric conversion element and configured to isolate the photoelectric conversion element from a photoelectric conversion element included in another unit pixel adjacent to the unit pixel; an anti-reflection layer disposed at a surface of the substrate layer; and a light guide disposed in at least a partial area of the anti-reflection layer, wherein the light guide includes a material having a refractive index smaller than a refractive index of the anti-reflection layer.

In some implementations, the image sensing device further comprises: an optical filter layer disposed over the anti-reflection layer and included in the unit pixel; and a grid layer disposed between the optical filter layer of the unit pixel and an optical filter layer of the another unit pixel.

In some implementations, the material includes air.

In some implementations, the light guide has a shape protruding from a surface of the anti-reflection layer.

In some implementations, the material has the refractive index smaller than a refractive index of the optical filter layer that is greater than a refractive index of the grid layer.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
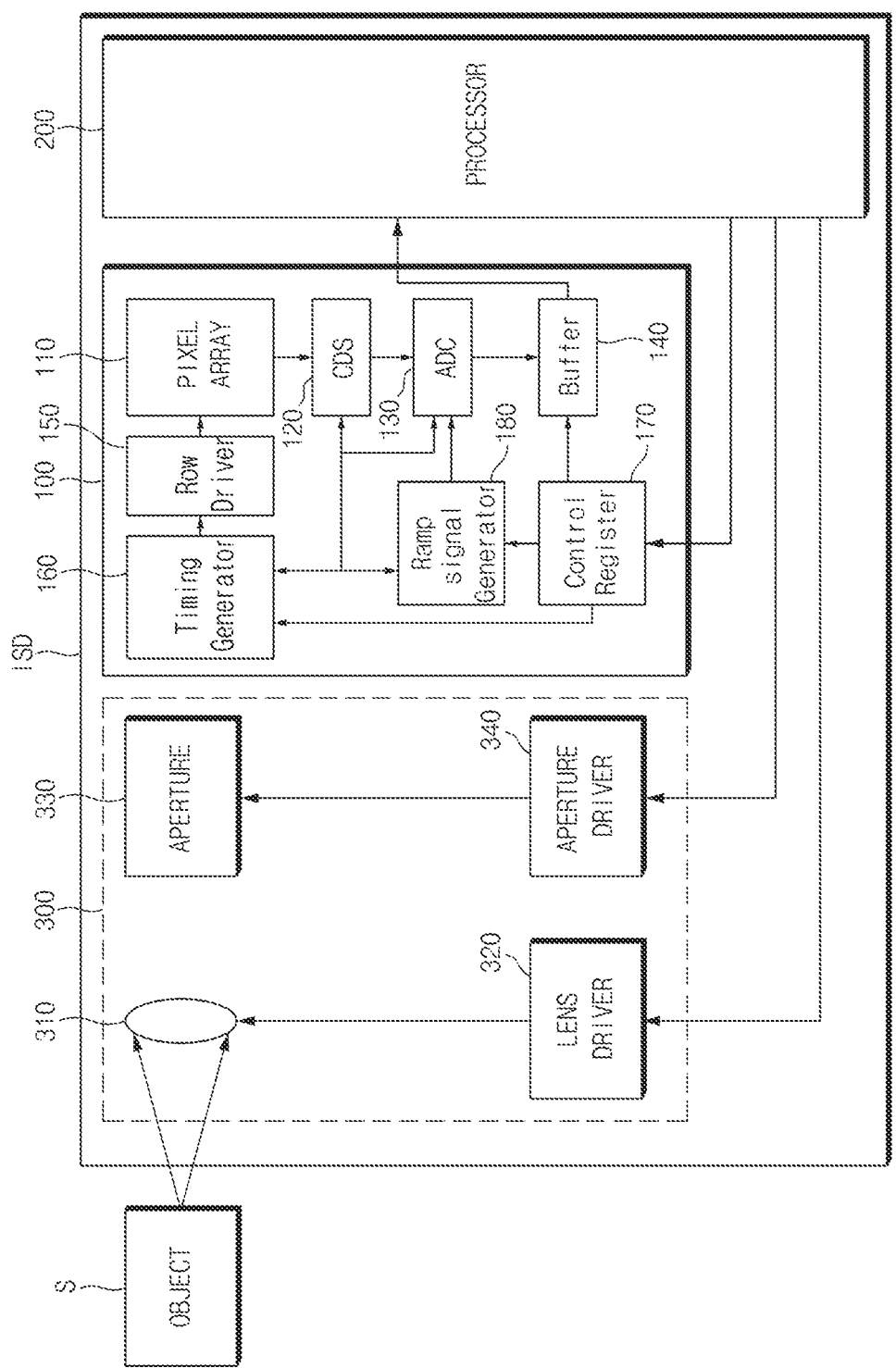
FIG. 1 is a block diagram illustrating an example of an image sensing device based on some implementations of the disclosed technology.

This patent document provides implementations and examples of image sensing device capable of performing a phase-difference detection autofocus (PDAF) function that may be used in configurations to substantially address one or more technical or engineering issues and to mitigate limitations or disadvantages encountered in some other image sensing device designs. Some implementations of the disclosed technology relate to an image sensing device including a light guide unit for dividing incident light into a plurality of light beams to be transferred to a plurality of photoelectric conversion elements, so that the image sensing device can control the amount of light to be transmitted to a plurality of photoelectric conversion elements using the light guide unit. Some implementations of the disclosed technology relate to an image sensing device including a light guide unit without forming an isolation structure between photoelectric conversion elements included in a unit pixel, such that the image sensing device can easily guide incident light while increasing light reception efficiency of a unit pixel. In recognition of the issues above, the disclosed technology provides the image sensing device including a light guide unit for dividing incident light into a plurality of light beams to be transferred to a plurality of photoelectric conversion elements, thereby increasing the accuracy of an autofocus function. The disclosed technology provides the image sensing device configured to include a light guide unit through a simple process, such that the image sensing device can reduce light reception efficiency deterioration caused by the isolation structure while increasing the manufacturing efficiency thereof.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

In the following description, a detailed description of related known configurations or functions incorporated herein will be omitted to avoid obscuring the subject matter.

The terminology used herein is for the purpose of describing particular embodiments only and is not intended to be limiting of the disclosed technology.

FIG. 1 is a block diagram illustrating an example of an image sensing device ISD based on some implementations of the disclosed technology. A method for performing an autofocus (AF) function by the image sensing device ISD and a method for generating phase difference data by the image sensing device ISD will hereinafter be described with reference to FIG. 1.

Referring to FIG. 1, the image sensing device ISD may include an imaging circuit 300, an image sensor 100, and a processor 200.

The imaging circuit 300 may be or include a component that receives light. For example, the imaging circuit 300 may include one or more lenses 310, a lens driver 320, an aperture 330, and an aperture driver 340.

The lens 310 may include one or more lenses. In some implementations, a single lens is included in the imaging circuit 300. In some implementations, a plurality of lenses is included in the imaging circuit 300.

The lens driver 320 may control the position of the lens 310 based on a control signal of a processor 200. As the position of the lens 310 is adjusted, the distance between the lens 310 and the target object (S) may also be adjusted.

The aperture 330 may adjust the amount of light to be incident upon the lens 310 based on a control signal from the aperture driver 340. As the amount of light (i.e., the amount of reception light) to be incident upon the lens 310 is adjusted through the aperture 330, the magnitude of signals generated by the image sensor 100 can also be adjusted in response to the adjusted amount of light.

The aperture driver 340 may control the aperture 330, such that the aperture driver 340 can adjust the amount of light to be incident upon the lens 310 using the aperture 330.

The processor 200 may transmit a signal for adjusting the position of the lens 310 to the lens driver 320 based on a signal generated by the image sensor 100, or may transmit a signal for adjusting a value of the aperture 330 to the aperture driver 340.

The image sensor 100 may include a pixel array 110, a correlated double sampler (CDS) 120, an analog-digital converter (ADC) 130, a buffer 140, a row driver 150, a timing generator 160, a control register 170, and a ramp signal generator 180.

In some implementations, the pixel array 110 may include at least one unit pixel. According to an embodiment, the unit pixel may include four photoelectric conversion elements arranged in a (2×2) matrix. According to another embodiment, the unit pixel may include two photoelectric conversion elements arranged vertically or horizontally.

The structure of the unit pixel and the shape of the unit pixel arranged in the pixel array 110 will be described in detail with reference to FIGS. 2 to 4G.

Incident light (optical signal) having passed through the lens 310 and the aperture 330 may be processed by the pixel array 110 and converted into an electrical signal. Unit pixels may respectively generate electrical signals corresponding to an external object (S).

The photoelectric conversion elements of unit pixels included in the pixel array 110 may absorb light to generate electrical charges, and may provide an electrical signal corresponding to the generated electrical charges to the correlated double sampler (CDS) 120.

The correlated double sampler (CDS) 120 may sample and hold electrical signals received from the pixel array 110. The correlated double sampler (CDS) 120 may perform double sampling of a signal level caused by incident light and a specific noise level, and may thus output a signal level corresponding to a difference between the sampling resultant signals.

The analog-to-digital converter (ADC) 130 may convert the received analog signal into a digital signal, and may transmit the digital signal to the buffer 140.

The buffer 140 may latch the received digital signals, and may sequentially output the latched digital signals to the processor 200. The buffer 140 may include a memory for latching the digital signal and a sense amplifier for amplifying the digital signal.

The row driver 150 may drive the plurality of unit pixels included in the pixel array 110 in response to an output signal of the timing generator 160.

For example, the row driver 150 may generate a selection signal to select any one of the row lines. In addition, the row driver 150 may generate signals (e.g., a transfer-transistor drive signal, a reset-transistor drive signal, a selection-transistor drive signal, etc.) to drive transistors contained in the unit pixels.

The timing generator 160 may control the row driver 150, such that the pixel array 110 can accumulate charges by absorbing light, can temporarily store the accumulated charges, or can output an electrical signal corresponding to the stored charges to the outside of the pixel array 110.

The timing generator 160 may control the correlated double sampler (CDS) 120 to sample and hold electrical signals received from the pixel array 110.

The control register 170 may generate control signals to control the buffer 140, the timing generator 160, and the ramp signal generator 180 based on the signal received from the processor 200.

The ramp signal generator 180 may generate a reference signal that enables the analog-to-digital converter (ADC) 130 to detect a signal in response to a control signal received from the timing generator 160.

The processor 200 may receive an output signal of the buffer 140 as an input, such that the processor 200 can generate image data or phase difference data based on the received signal. As described above, the processor 200 may transmit a control signal for the aperture driver 340 using the image data. In addition, the processor 200 may transmit a control signal for the lens driver 320 using the phase difference data.

The processor 200 may generate phase difference data for the external object (S) using signals respectively corresponding to a plurality of photoelectric conversion elements included in an arbitrary unit pixel.

A plurality of photoelectric conversion elements included in an arbitrary unit pixel may share one microlens.

When the photoelectric conversion elements included in unit pixels share one microlens, each of the photoelectric conversion elements included in unit pixels located adjacent to one another in a row direction or a column direction of the pixel array 110 include at least a corresponding portion of one microlens.

The processor 200 may generate a plurality of phase data pieces for the target object (S) by calculating signals generated from a plurality of photoelectric conversion elements included in one unit pixel.

If the distance between the lens 310 and the target object (S) is considered to be "in-focus position", incident lights which have passed through one microlens and reached the respective photoelectric conversion elements may have the same magnitude. Thus, the signals detected by the photoelectric conversion elements sharing one microlens may have the same magnitude. Therefore, when the distance between the lens 310 and the target object (S) satisfies the in-focus position, phase data generated from each of the photoelectric conversion elements by the processor 200 may be identical.

When the distance between the lens 310 and the target object (S) does not satisfy the in-focus position, incident light beams which have passed through one microlens and reached the respective photoelectric conversion elements may have different intensities (e.g., magnitudes) from each other. Thus, different intensities of light may reach the respective photoelectric conversion elements after passing through one microlens. This is because paths for the incident light beams to arrive at the unit pixels are different from each other. As a result, signals respectively detected by the photoelectric conversion elements sharing one microlens may have different intensities.

In this case, there exists a phase difference between phase data generated by different signals. For example, the phase data generated by different signals are different from one another by a predetermined phase.

If the distance between the lens 310 and the target object (S) does not satisfy the in-focus position, the processor 200 may calculate a phase difference between the phase data generated by different signals, and may thus generate phase difference data.

The processor 200 may provide a control signal for the lens driver 320 based on the phase difference data, and may perform the autofocus function by adjusting the distance between the target object (S) and the lens 310 and the distance between the pixel array 110 and the lens 310 using the control signal.

Figure 2:
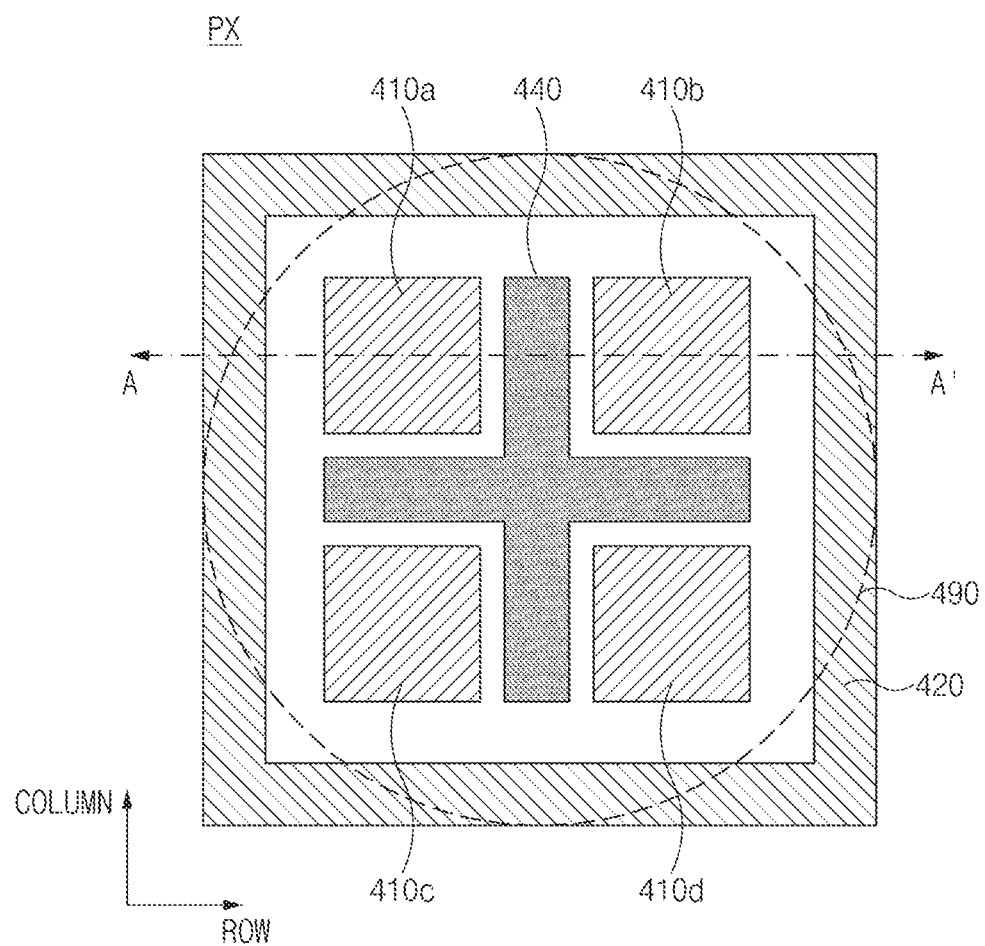
FIG. 2 is a diagram illustrating an example of a portion of a pixel array shown in FIG. 1 based on some implementations of the disclosed technology.

FIG. 2 is a diagram illustrating an example of a portion of the pixel array 110 shown in FIG. 1 based on some implementations of the disclosed technology.

FIG. 2 is a schematic diagram illustrating an example of the shape of the unit pixel (PX) included in the pixel array 110 (see FIG. 1).

The unit pixel (PX) may include four photoelectric conversion elements (410a, 410b, 410c, 410d) arranged in a row direction and a column direction of the pixel array to form a (2×2) matrix.

The four photoelectric conversion elements (410a, 410b, 410c, 410d) may be isolated from other unit pixels adjacent to the unit pixel (PX) by the isolation structure 420.

A light guide unit 440 for guiding incident light may be disposed between the photoelectric conversion elements (410a, 410b, 410c, 410d). For example, the light guide unit 440 is disposed between two adjacent photoelectric conversion elements in a row direction and a column direction. For example, the light guide unit 440 has two portions extending in the row direction and the column direction. For example, the light guide unit 440 is disposed to locate at a center of the unit pixel PX. Incident light that is incident upon the unit pixel (PX) may be guided by the light guide unit 440 to be uniformly incident upon the plurality of photoelectric conversion elements (410a, 410b, 410c, 410d).

A cross-section of the light guide unit 440 may have a cross shape extending in the row and column directions of the pixel array 110. As the light guide unit 440 is formed in a cross shape, light that is incident upon the unit pixel (PX) may be guided to the plurality of photoelectric conversion elements (410a, 410b, 410c, 410d), and individual signals may be generated from the photoelectric conversion elements 410a, 410b, 410c, and 410d, respectively.

A microlens 490 may overlap upper portions of the photoelectric conversion elements (410a, 410b, 410c, 410d) and the light guide unit 440. Thus, the photoelectric conversion elements (410a, 410b, 410c, 410d) may share the microlens 490.

In some implementations, the processor 200 (see FIG. 1) may generate first phase data for the target object (S) by calculating signals generated from two photoelectric conversion elements (410a, 410c) located at a left side with respect to the center point of the unit pixel (PX) or signals generated from two photoelectric conversion elements (410a, 410b) located at an upper side with respect to the center point of the unit pixel (PX).

In some implementations, the processor 200 may generate second phase data for the target object (S) by calculating signals generated from two photoelectric conversion elements (410b, 410d) located at a right side with respect to the center point of the unit pixel (PX) or signals generated from two photoelectric conversion elements (410c, 410d) located at a lower side with respect to the center point of the unit pixel (PX).

The processor may generate phase difference data by calculating the first phase data and the second phase data.

Figure 3A:
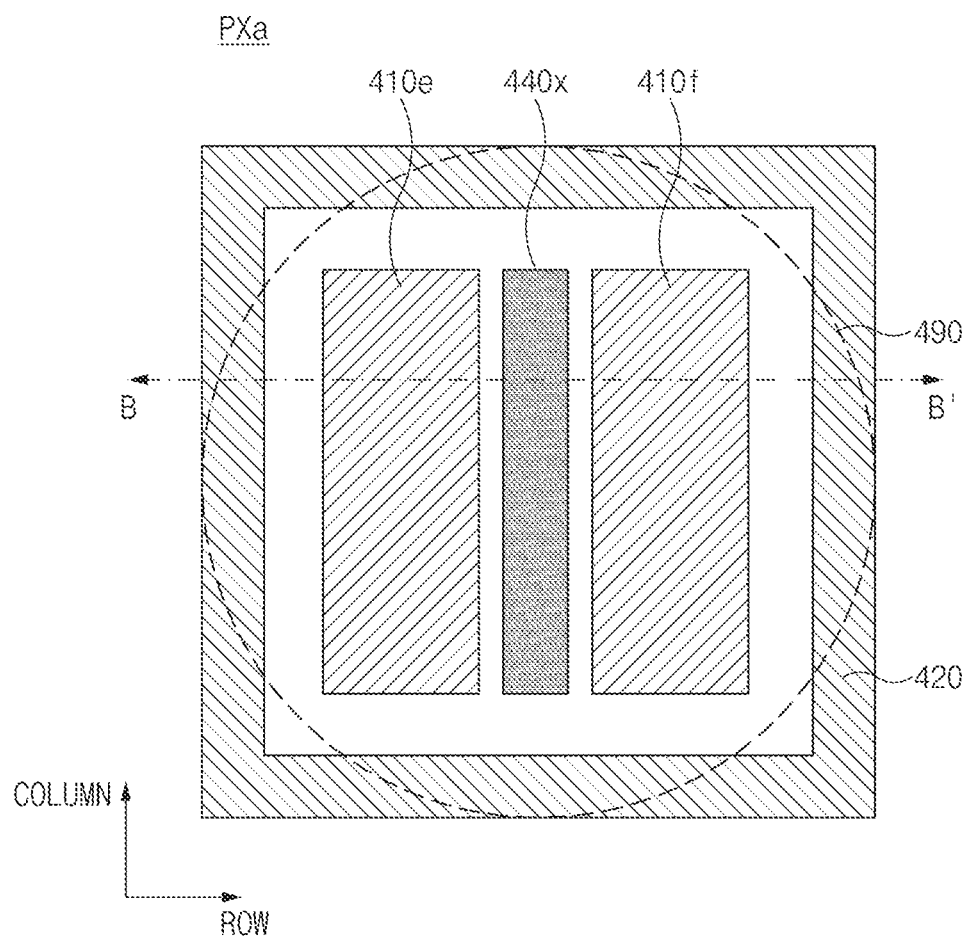
FIGS. 3A and 3B are diagrams illustrating examples of a portion of a pixel array based on some other implementations of the disclosed technology.
Figure 3B:
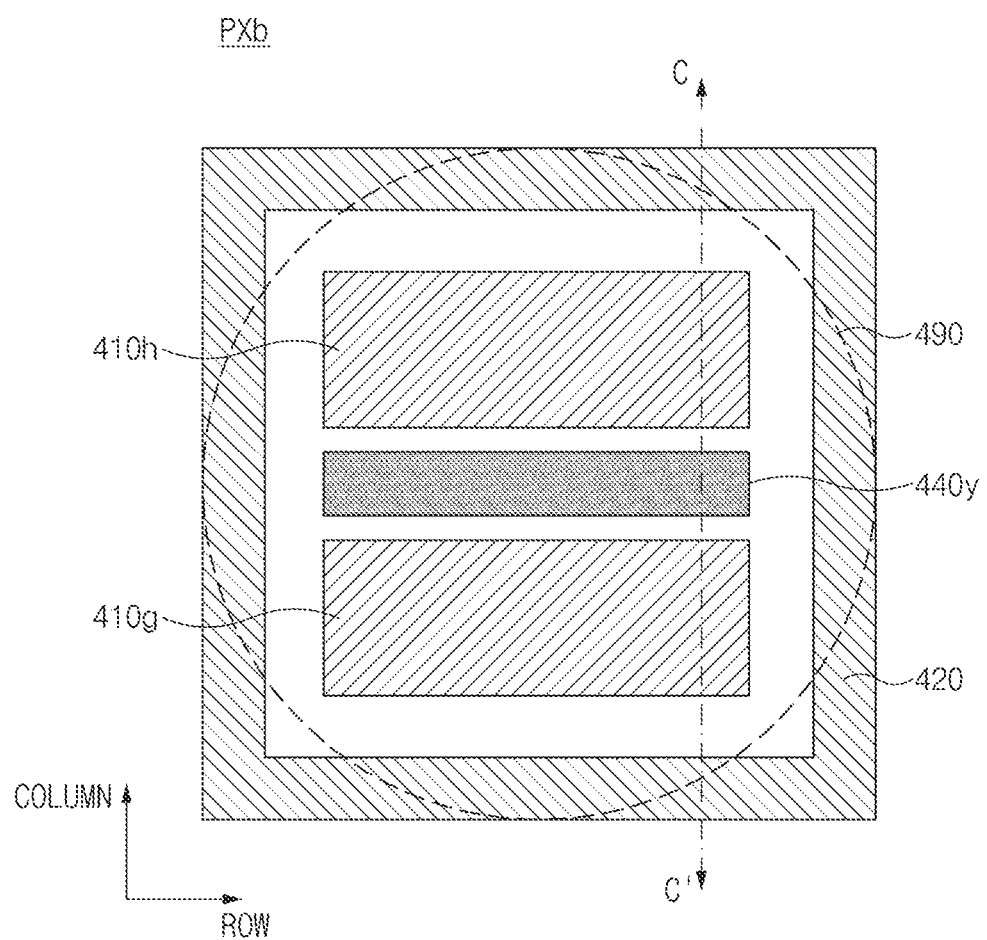

FIGS. 3A and 3B are diagrams illustrating examples of a portion of a pixel array based on some implementations of the disclosed technology.

FIG. 3A illustrates an example of a unit pixel (PXa) including two photoelectric conversion elements (410e, 410f) arranged in a row direction of the pixel array 110.

FIG. 3B illustrates an example of a unit pixel (PXb) including two photoelectric conversion elements (410g, 410h) arranged in a column direction of the pixel array 110.

Referring to FIG. 3A, a light guide part 440x disposed between two photoelectric conversion elements 410e and 410f disposed in a row direction of the pixel array may extend in a column direction of the pixel array 110. Accordingly, light incident upon the unit pixel (PXa) may be divided into a plurality of light beams to be transferred to the photoelectric conversion elements 410e and 410f disposed in the row direction of the pixel array, so that the plurality of light beams can be transferred to the photoelectric conversion elements 410e and 410f.

Referring to FIG. 3B, a light guide unit 440y disposed between the two photoelectric conversion elements 410g and 410h arranged in a column direction of the pixel array may extend in the row direction of the pixel array 110. Accordingly, light incident upon the unit pixel (PXb) may be divided into a plurality of light beams to be transferred to the photoelectric conversion elements 410g and 410h disposed in the column direction of the pixel array, so that the plurality of light beams can be transferred to the photoelectric conversion elements 410g and 410h.

Referring to FIGS. 3A and 3B, two photoelectric conversion elements 410e and 410f or 410g and 410h may share one microlens 490.

As can be seen from FIG. 3A, the processor 200 may generate first phase data for the target object (S) by calculating a signal generated from the photoelectric conversion element 410e located at the left side from the center of the unit pixel (PXa), and may generate second phase data for the target object (S) by calculating a signal generated from the photoelectric conversion element 410f located at the right side from the center of the unit pixel (PXa).

As can be seen from FIG. 3B, the processor 200 may generate first phase data for the target object (S) by calculating a signal generated from the photoelectric conversion element 410b located at the upper side from the center of the unit pixel (PXb), and may generate second phase data for the target object (S) by calculating a signal generated from the photoelectric conversion element 410g located at the lower side from the center of the unit pixel (PXb).

In some implementations, for one pixel array, the unit pixel (PXa) of FIG. 3A and the unit pixel (PXb) of FIG. 3B may be selectively arranged.

FIGS. 4A to 4G are cross-sectional views illustrating examples of shapes of light guide units based on different implementations of the disclosed technology.

FIGS. 4A to 4G are cross-sectional views illustrating examples of the unit pixel taken along a first cutting line A-A' shown in FIG. 2. Although the descriptions below are provided with reference to the example in FIG. 2, the cross-sectional view as shown in FIGS. 4A to 4G can illustrate examples of the unit pixel taken along a second cutting line B-B' of the row direction of FIG. 3A or examples of the unit pixel taken along a third cutting line C-C' of the column direction of FIG. 3B.

Figure 4A:
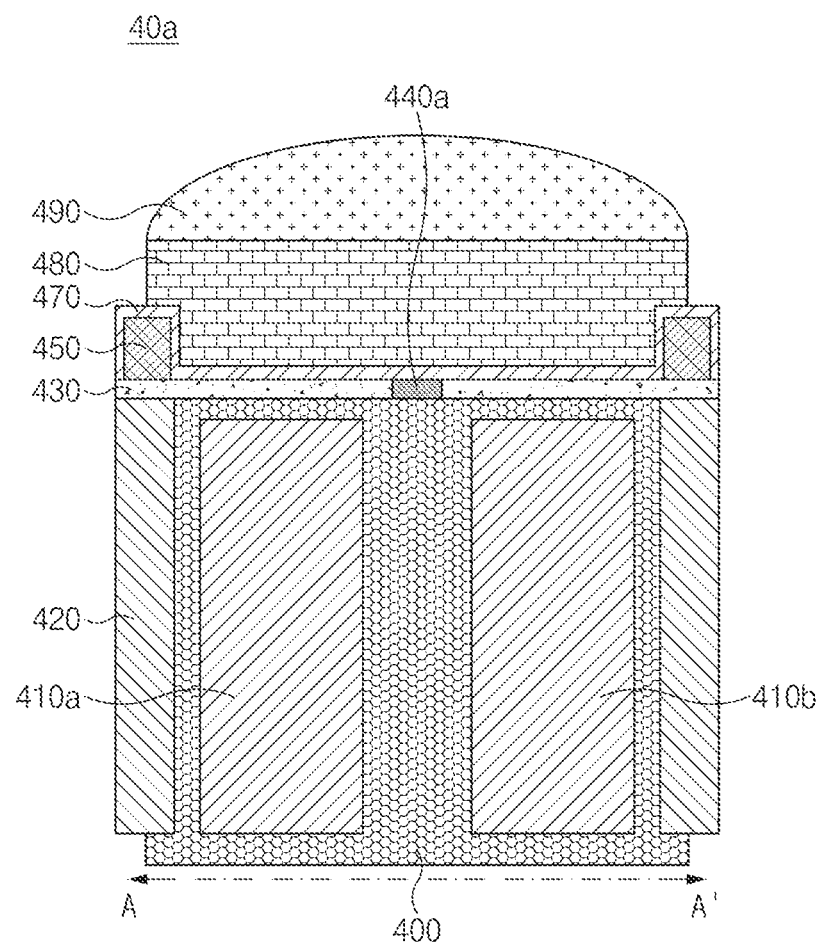
FIGS. 4A to 4G are cross-sectional views illustrating examples of shapes of light guide units based on different implementations of the disclosed technology.

Referring to FIG. 4A, a first cross-section 400a of the unit pixel (PX) disposed in the pixel array 110 may include a substrate layer 400, photoelectric conversion elements 410a and 410b, and an isolation structure 420, a first anti-reflection layer 430, a light guide unit 440a, a grid layer 450, a second anti-reflection layer 470, an optical filter layer 480, and/or a microlens 490.

The substrate layer 400 may include one surface and the other surface facing or opposite to the one surface. For example, the substrate layer 400 may be or include a monocrystalline silicon substrate. The substrate layer 400 may be a P-type or N-type bulk substrate, may be a substrate formed by growing a P-type or N-type epitaxial layer on the P-type bulk substrate, or may be a substrate formed by growing a P-type or N-type epitaxial layer on the N-type bulk substrate.

The photoelectric conversion elements 410*a* and 410*b* may be disposed in the substrate layer 400. For example, each of the photoelectric conversion elements 410*a* and 410*b* may be implemented as a photodiode, a phototransistor, a photogate, a pinned photodiode (PPD), or a combination thereof. For convenience of description, it is assumed that each of the photoelectric conversion elements 410*a* and 410*b* is implemented as a photodiode as an example.

Each of the photoelectric conversion elements 410*a* and 410*b* may be formed as an N-type doped region through ion implantation of N-type ions. In some implementations, each of the photoelectric conversion elements 410*a* and 410*b* may include a stacked structure in which a plurality of doped regions is vertically stacked.

The photoelectric conversion elements 410*a* and 410*b* may be arranged across as large a region as possible to increase light reception (Rx) efficiency of the unit pixel (PX). The photoelectric conversion elements 410*a* and 410*b* may individually output signals corresponding to incident light.

The isolation structure 420 may be formed to completely surround each unit pixel (PX) or may be formed to at least partially surround each unit pixel (PX). The isolation structure 420 may be disposed along an edge of the unit pixel. Since the isolation structure 420 is disposed along the edge of the unit pixel, there is no isolation structure disposed under the light guide unit 440. The isolation structure 420 may electrically and optically separate adjacent unit pixels (PXs) from each other. The isolation structure 420 may be formed in a direction perpendicular to one surface of the substrate layer 400.

The isolation structure 420 may be formed through a deep trench isolation (DTI) process. The depth and formation position of the isolation structure 420 may be experimentally determined according to the size, separation performance, etc. of the unit pixel PX and the photoelectric conversion elements (410*a*, 410*b*).

The isolation structure 420 may be formed of or include a material having a refractive index different from that of the substrate layer 400 in order to prevent optical crosstalk between photoelectric conversion elements respectively included in adjacent unit pixels (PXs). For example, the isolation structure 420 may be formed of or include a dielectric material such as a silicon oxide layer or a silicon nitride layer.

The first anti-reflection layer 430 may be disposed at one surface of the substrate layer 400, and may overlap the photoelectric conversion elements 410*a* and 410*b*. The first anti-reflection layer 430 may include a material having relatively high light transmittance that is sufficiently high to allow the incident light to pass through the first anti-reflection layer 430 and be easily transferred to the photoelectric conversion elements 410*a* and 410*b*.

The first anti-reflection layer 430 may include a plurality of layers having different refractive indices. For example, the first anti-reflection layer 430 may include at least one of silicon oxide, silicon nitride, hafnium nitride, or others.

The light guide unit 440*a* may be in contact with the first anti-reflection layer 430, and may be disposed between the plurality of photoelectric conversion elements 410*a* and 410*b*. The light guide unit 440*a* may include a material having a refractive index smaller than that of the optical filter layer 480 and a material having a refractive index smaller than that of the first anti-reflection layer 430.

Incident light entering the light guide unit 440*a* after passing through the optical filter layer 480 may be guided by the light guide unit 440*a*, and may be divided into a plurality of light beams, so that the plurality of light beams can be transferred to the plurality of photoelectric conversion elements 410*a* and 410*b*.

Since the refractive index of the light guide unit 440*a* is lower than each of the refractive index of the optical filter layer 480 and the refractive index of the first antireflection layer 430, the light guide unit 440*a* can easily separate incident light.

In some implementations, the light guide unit 440*a* may be formed inside the first anti-reflection layer 430 by, for example, etching at least a portion of the first anti-reflection layer 430.

The light guide unit 440*a* may include an air layer. For example, the light guide unit 440*a* may have a structure that allows the light guide unit 440*a* to contain air to configure the air layer. When the light guide unit 440*a* includes the air layer, the refractive index of the light guide unit 440*a* may be substantially equal to the refractive index of air.

As the light guide unit 440*a* divides incident light into a plurality of light beams and provides the plurality of light beams to the plurality of photoelectric conversion elements 410*a* and 410*b*, signals corresponding to the respective photoelectric conversion elements 410*a* and 410*b* may be output. Accordingly, the plurality of photoelectric conversion elements 410*a* and 410*b* included in one unit pixel may be individually activated by the light guide unit 440*a*.

The light guide unit 440*a* shown in FIG. 4A may be referred to as a first light guide unit 440*a*.

The first light guide unit 440*a* may be provided inside the first anti-reflection layer 430, and may have the same height as the first anti-reflection layer 430 with respect to one surface of the substrate layer 400.

The grid layer 450 may be disposed to overlap the isolation structure 420. The grid layer 450 may include a plurality of layers. For example, the grid layer 450 may include an air layer and a layer including at least one of metal and metal nitride. The grid layer 450 may prevent incident light traveling toward the grid layer 450 from passing over to other adjacent unit pixels, thereby preventing crosstalk caused by such incident light.

In some implementations, the grid layer 450 may illustratively include a titanium nitride (TiN) or tungsten (W) layer. The metal nitride or metal layer may function to secure physical strength of the grid layer 450. Since the metal or metal nitride layer is provided in the grid layer 450, the influence of volume change due to temperature of the grid layer 450 can be reduced and reliability of the device can be secured.

The grid layer 450 may include a material layer having a refractive index smaller than that of the optical filter layer 480 (e.g., 1.6 to 1.7). The grid layer 450 may exemplarily include a layer having a refractive index of 1.4 to 1.5. For example, the grid layer 450 may include a dielectric material such as silicon nitride or silicon oxide.

In some implementations, the grid layer 450 may include an air layer having the same refractive index as air. For example, the grid layer 450 may have a structure that allows to contain air to configure the air layer.

Since the grid layer 450 includes a layer having a refractive index smaller than that of the optical filter layer 480, the incident light having passed through the optical filter layer 480 may be guided toward the light guide unit 440a included in the unit pixel. The grid layer 450 may be disposed between adjacent optical filter layers 480.

The second anti-reflection layer 470 may be in contact with the first anti-reflection layer 430, the light guide unit 440a, and the grid layer 450. For example, the second anti-reflection layer 470 may overlap the light guide unit 440a and the grid layer 450.

The second anti-reflection layer 470 may include a material having relatively high light transmittance, and incident light may pass through the second anti-reflection layer 470 and be easily transferred to the photoelectric conversion elements 410a and 410b.

The second anti-reflection layer 470 may include a plurality of layers having different refractive indices. For example, the second anti-reflection layer 470 may include at least one of silicon oxide, silicon nitride, hafnium nitride, or others.

In some implementations, the second anti-reflection layer 470 may include the same material as the first anti-reflection layer 430.

The second anti-reflection layer 470 may be in contact with the first anti-reflection layer 430, the light guide unit 440a, and the grid layer 450, and maybe formed to overlap the entire surface of the substrate layer 400, thereby securing mechanical stability of the grid layer 450. In addition, the second anti-reflection layer 470 may serve as a planarization layer for one surface of the substrate layer 400.

The optical filter layer 480 may be formed over the second anti-reflection layer 470, and may be disposed to overlap the photoelectric conversion elements 410a and 410b. The optical filter layer 480 may enable light corresponding to an arbitrary wavelength to selectively pass therethrough. For example, the optical filter layer may selectively pass or transmit light in a wavelength band corresponding to red, green, blue, magenta, yellow, or cyan.

The optical filter layer 480 may be formed to overlap the grid layer 450 and the light guide unit 440a. In some implementations, a grid layer 450 may be formed between adjacent optical filter layers 480. The optical filter layer 480 may have a refractive index of 1.6 to 1.7, and the optical filter layer 480 may have a higher refractive index than the light guide unit 440a.

A microlens 490 may be disposed on the optical filter layer 480. The microlens 490 may enable light incident upon the pixel array 110 to converge upon the optical filter layer 480 and the photoelectric conversion elements 410a and 410b.

Each of the unit pixels may include an interconnect layer (e.g., a wiring layer) disposed below the substrate layer 400. The interconnect layer (not shown) may include a reset transistor, a transfer transistor, a floating diffusion (FD) region, a drive transistor, a selection transistor, and/or others.

The reset transistor may be activated in response to a reset signal, such that the reset transistor may reset the potential of each unit pixel to a predetermined voltage level (e.g., a pixel voltage level).

In some implementations, when the reset transistor is activated, the transfer transistor may also be activated to reset the floating diffusion (FD) region.

Since the transfer transistor is activated in response to a transmission (Tx) signal, the transfer transistor can transmit charges accumulated in the photoelectric conversion element of each pixel to the floating diffusion (FD) region.

The floating diffusion (FD) region may receive charges generated by the photoelectric conversion element, may accumulate the received charges, and may thus convert the accumulated charges into a voltage signal.

The drive transistor may receive a pixel voltage through a drain electrode thereof, and may be coupled to the floating diffusion (FD) region through a gate electrode thereof. In addition, the drive transistor may be coupled to the selection transistor through a source terminal thereof.

The drive transistor may output a current corresponding to the voltage of the floating diffusion (FD) region coupled to a gate electrode thereof to a signal line through the selection transistor.

The selection transistor may be activated in response to a selection signal applied to a gate electrode thereof, such that the selection transistor may transmit an output signal of the drive transistor to a signal line. The electrical signals applied to the signal line may be provided to the correlated double sampler (CDS) 120 (see FIG. 1). The electrical signal provided to the correlated double sampler 120 may then be processed by the processor 200 and output as phase difference data.

Figure 4B:
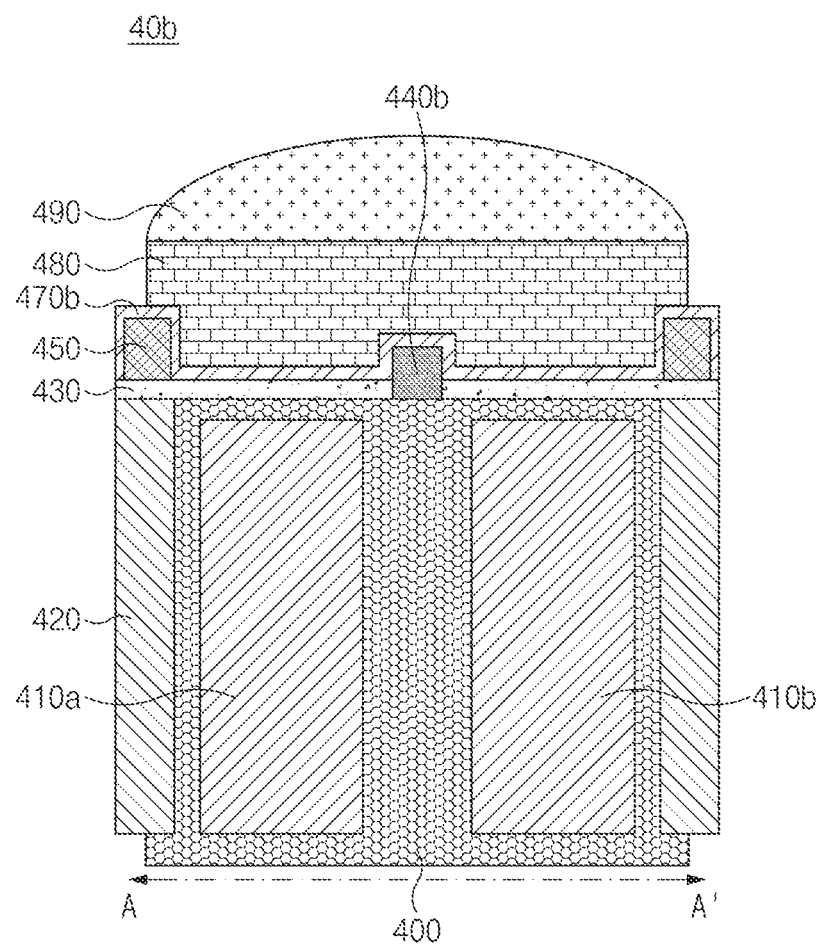

In FIB. 4B, the light guide unit 440b and the second anti-reflection layer 470b have different shapes from those of FIG. 4A, while the remaining parts of the cross-section 40b of FIG. 4B may be substantially identical to those shown in FIG. 4A. Thus, the redundant description for the identical parts will be omitted for brevity and the different parts of the example as shown in FIG. 4B from those as shown in FIG. 4A will be described in the below.

The light guide unit 440b of FIG. 4B may be referred to as a second light guide unit 440b.

The second light guide unit 440b may have a shape extending from one surface of the substrate layer 400 to the optical filter layer 480. The second light guide unit 440b may be thicker than each of the first anti-reflection layer 430 and the second anti-reflection layer 470b.

Since the second light guide unit 440b has a shape extending from one surface of the substrate layer 400 to the optical filter layer 480, light incident upon the unit pixel can be more efficiently divided into a plurality of light beams.

In some implementations, since the second light guide unit 440b has a protruding shape, light beams obliquely incident upon the unit pixel can be isolated from each other by the second light guide unit 440b, and the isolated light beams can be guided separately through the second light guide unit 440b. Therefore, compared to the first light guide unit 440a, the light guide effect by the second light guide unit 440b may be significantly increased.

Figure 4C:
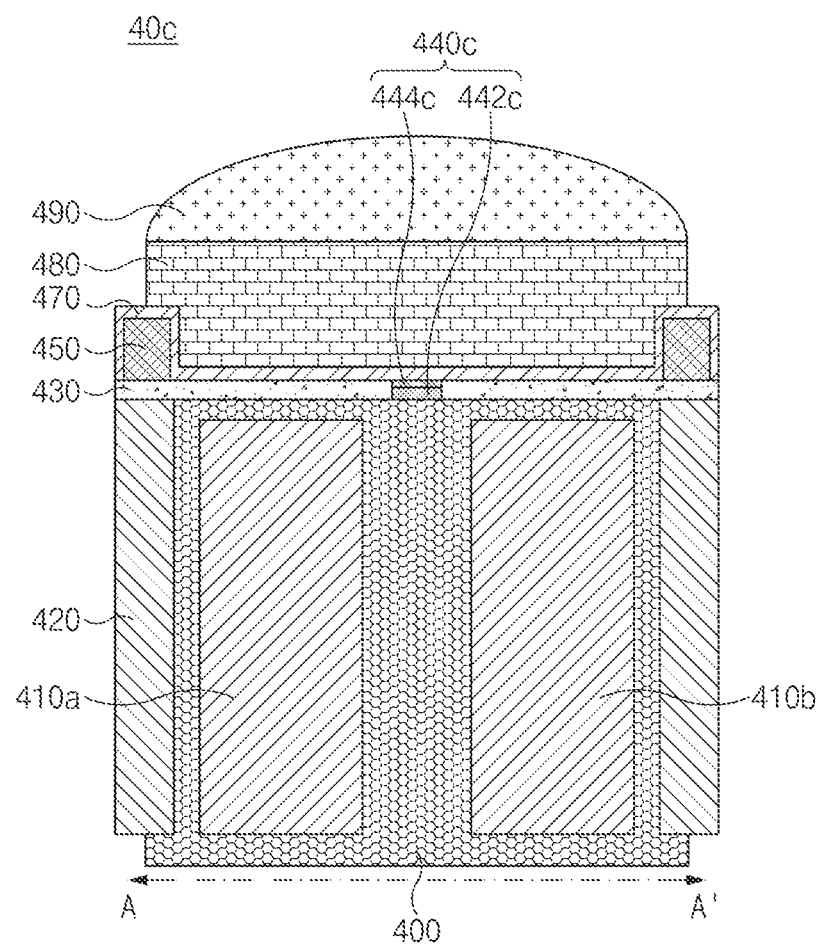

In FIG. 4C, a third light guide unit 440c shown in FIG. 4C has a different shape from that of FIG. 4A, while the remaining parts of the cross-section 40c of FIG. 4C may be substantially identical to those of the cross-section 40a shown in FIG. 4A. Thus, the redundant description for the identical parts will be omitted for brevity and the different parts of the example as shown in FIG. 4C from those as shown in FIG. 4A will be described in the below.

The third light guide unit 440c may include a first guide layer 442c and a second guide layer 444c.

The first guide layer 442c may be in contact with the substrate layer 400, and the second guide layer 444c may be disposed over the first guide layer 442c. In addition, the second guide layer 444c may be in contact with the second anti-reflection layer 470.

The refractive index of the first guide layer 442c may be higher than that of the second guide layer 444c. For example, the first guide layer 442c may be formed of or include a dielectric material layer, and the second guide layer 444c may be formed of or include an air layer. As the first guide layer 442c is provided, mechanical stability of the third light guide unit 440c may be significantly increased.

In addition, control of the optical path of the incident light by the third light guide unit 440c can be facilitated by randomly adjusting the refractive index of the first guide layer 442c and the refractive index of the second guide layer 444c.

Figure 4D:
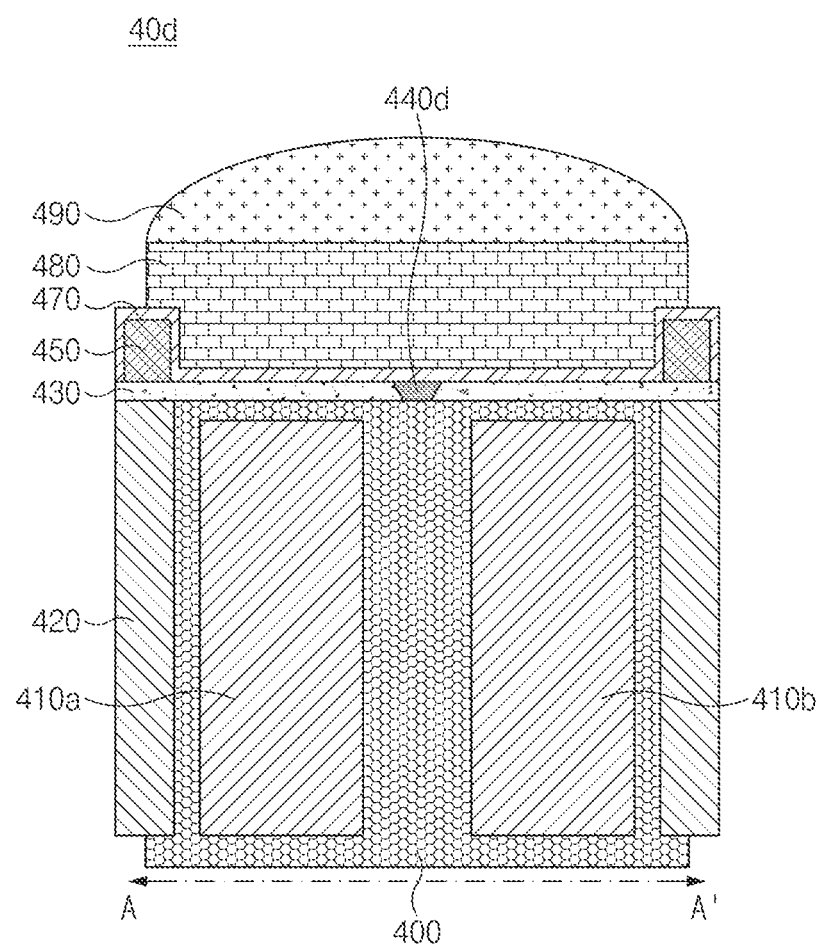
Figure 4E:
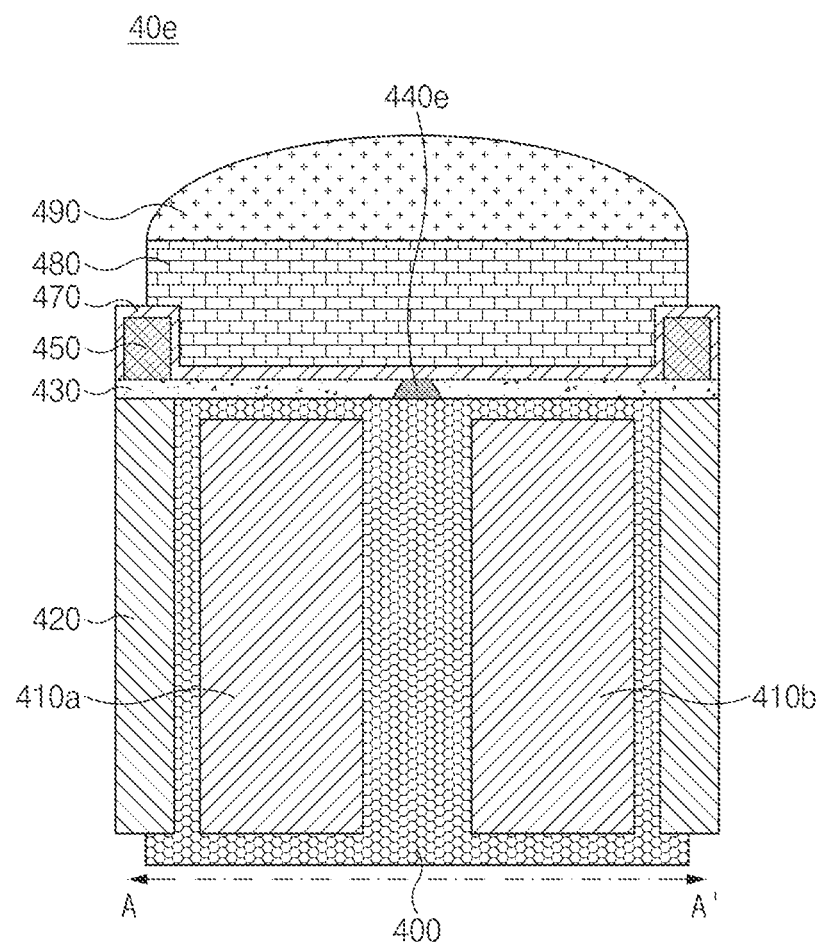
Figure 4F:
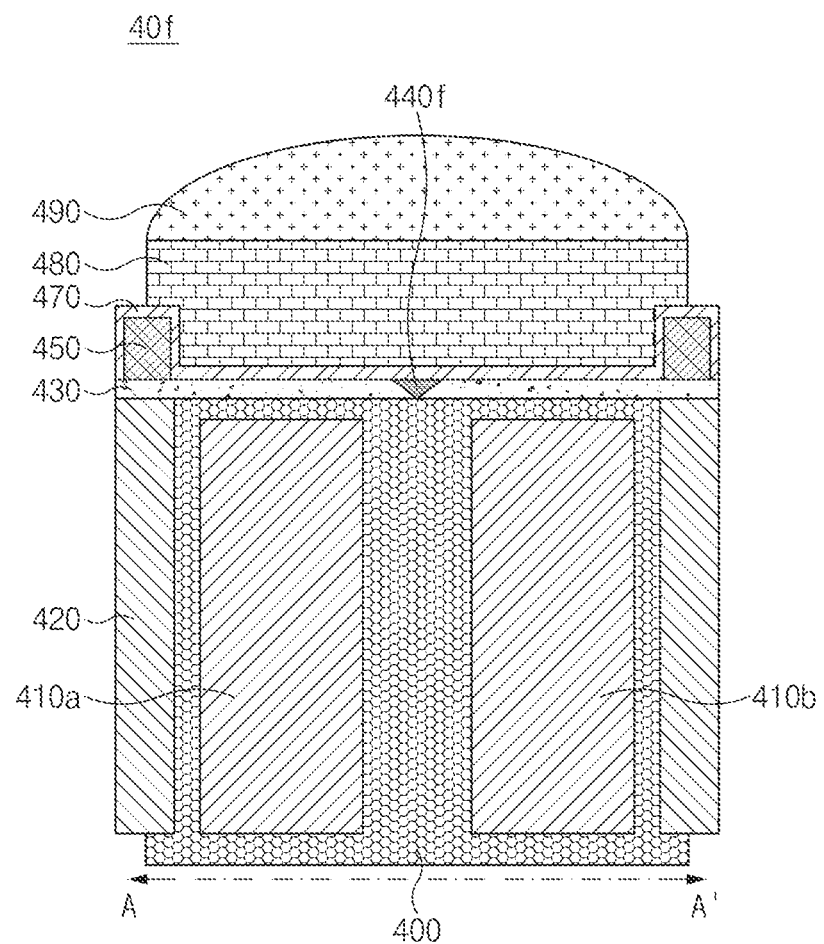
Figure 4G:
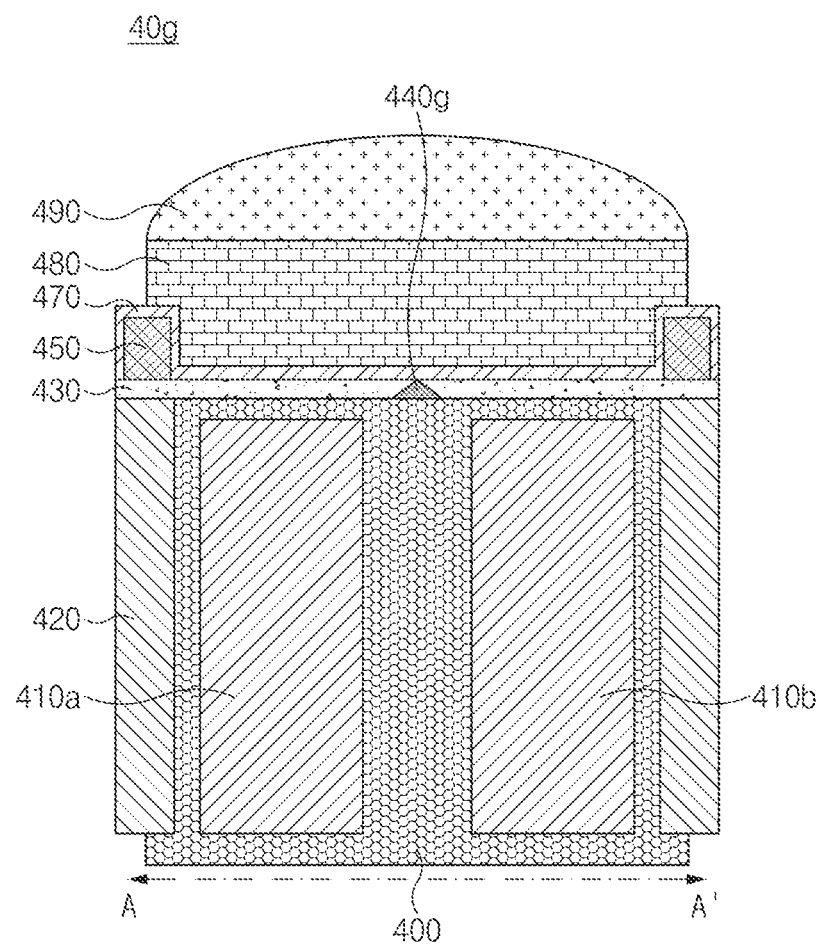

A fourth light guide unit 440d of FIG. 4D, a fifth light guide unit 440e of FIG. 4E, a sixth light guide unit 440f of FIG. 4F, and a seventh light guide unit 440g of FIG. 4G are different in terms of the shape from those of FIG. 4A. The remaining parts of the cross-sections 40d, 40e, 40f and 40g of FIGS. 4D, 4E, 4F, 4G may be substantially identical to those of the cross-section 40a shown in FIG. 4A. Thus, the redundant description for the identical parts will be omitted for brevity and the different parts of the example as shown in FIGS. 4D to 4G will be described in the below.

As can be seen from FIGS. 4D to 4G, embodiments in which an area of one surface of each of the light guide units 440d, 440e, 440f, and 440g is different from an area of the other surface opposite to the one surface are illustrated.

In addition, each of the fourth light guide unit 440d and the fifth light guide unit 440e may have a trapezoidal cross-section, and each of the sixth light guide unit 440f and the seventh light guide unit 440g may have a triangular cross-section.

In some implementations, the cross-sectional shape of the light guide unit may be affected by various factors, for example, the position of a unit pixel on the pixel array 110, the type of the optical filter layer 480, or others.

For example, a unit pixel located at an edge of the pixel array 110 may have a larger imbalance of signals output from the photoelectric conversion elements than a unit pixel located at the center of the pixel array 110.

In order to solve or address such imbalance, the light guide unit may guide the incident light by adjusting the cross-sectional shape of the light guide unit.

Since the refractive index is inversely proportional to the wavelength, the cross-sectional shape of the light guide unit may be adjusted to correct a difference in refractive index between incident light beams that have separated into different wavelengths after passing through the optical filter layer 480.

FIGS. 5A to 5F are cross-sectional views illustrating examples of processes of forming the light guide unit based on some implementations of the disclosed technology.

Figure 5A:
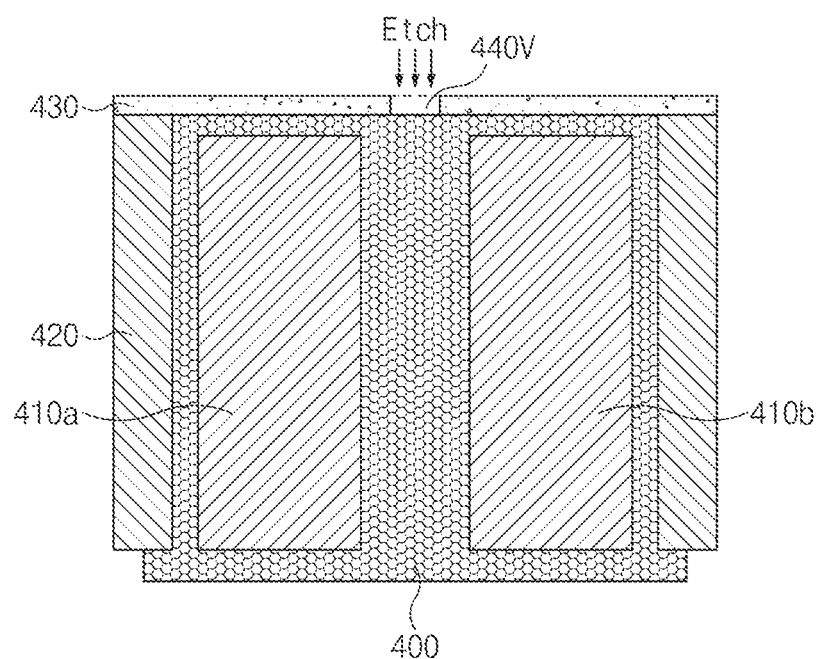
FIGS. 5A to 5F are cross-sectional views illustrating examples of processes of forming a light guide unit based on some implementations of the disclosed technology.

In FIG. 5A, a substrate layer 400 may include photoelectric conversion elements (410a, 410b) and an isolation structure 420, and a first anti-reflection layer 430 may be formed on one surface of the substrate layer 400.

A partial area of the first anti-reflection layer 430 may be etched to form the light guide unit. In this case, the etched area may be referred to as an etched region 440v.

In order to selectively form the etched region 440v, a mask, a photoresist, or others may be used.

Figure 5B:
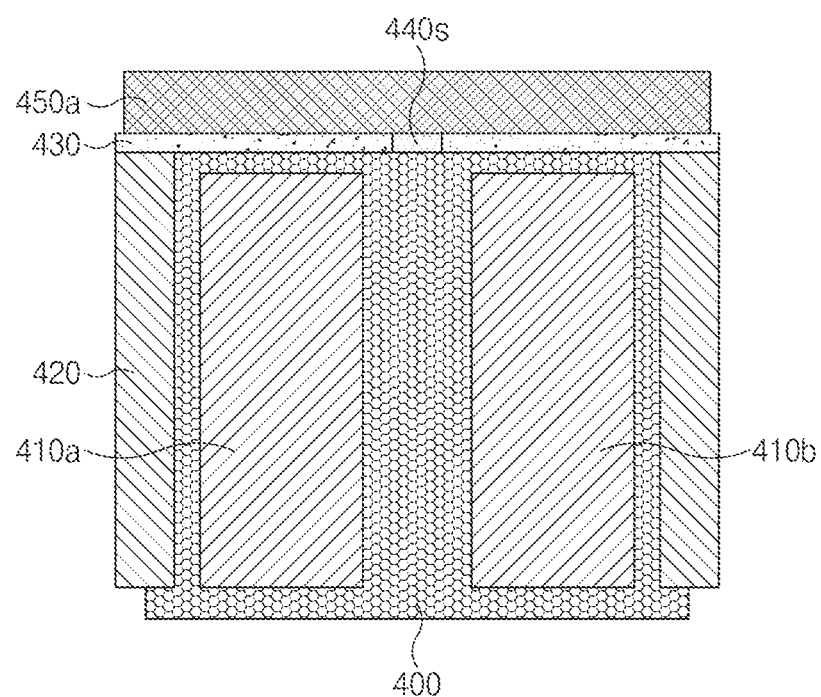

Referring to FIG. 5B, an embodiment in which a sacrificial layer 440s is formed in the etched region 440v and a pre-grid layer 450a is formed on the sacrificial layer 440s is illustrated as an example.

The pre-grid layer 450a may include a plurality of layers including different materials according to the structure of the grid layer 450 (see FIG. 4A).

The sacrificial layer 440s may serve to define a region where the light guide unit is formed. The sacrificial layer 440s may include, for example, a carbon-containing spin-on carbon (SOC) layer.

The pre-grid layer 450a may include, for example, a metal or metal nitride layer. The pre-grid layer 450a may further include a carbon-containing SOC layer formed over the metal or metal nitride layer, or may further include a dielectric material layer (such as silicon oxide or silicon nitride) formed over the metal or metal nitride layer.

Figure 5C:
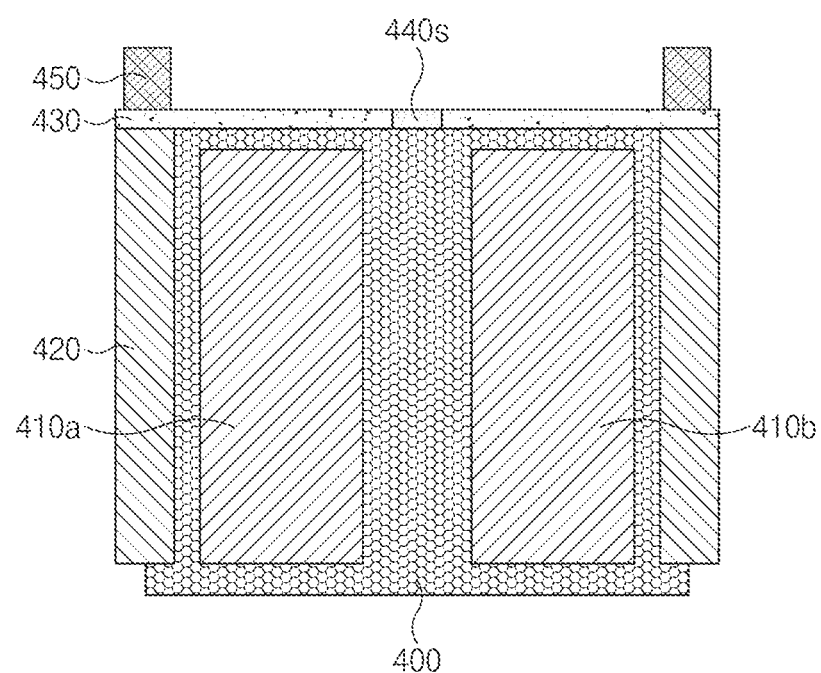

Referring to FIG. 5C, an embodiment in which the pre-grid layer 450a is etched to define a grid layer is illustrated as an example. The etching process may etch the remaining regions other than a region in which the grid layer 450 is defined using a mask pattern or the like.

Figure 5D:
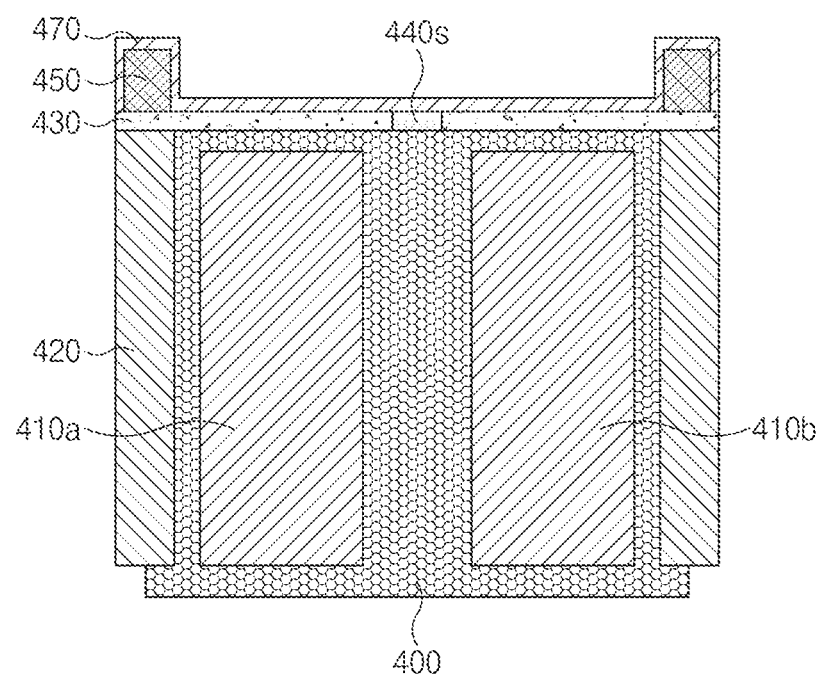

Referring to FIG. 5D, an embodiment in which a second anti-reflection layer 470 overlaps upper portions of the first anti-reflection layer 430, the sacrificial layer 440s, and the grid layer 450 is illustrated as an example.

The second anti-reflection layer 470 may be formed through a deposition process. The second anti-reflection layer 470 may be formed to a predetermined thickness through which molecules formed by combining gas used in a plasma process with carbon of the sacrificial layer 440s can be easily discharged outside.

For example, the second anti-reflection layer 470 may be formed to a thickness of 300 Å or less.

Figure 5E:
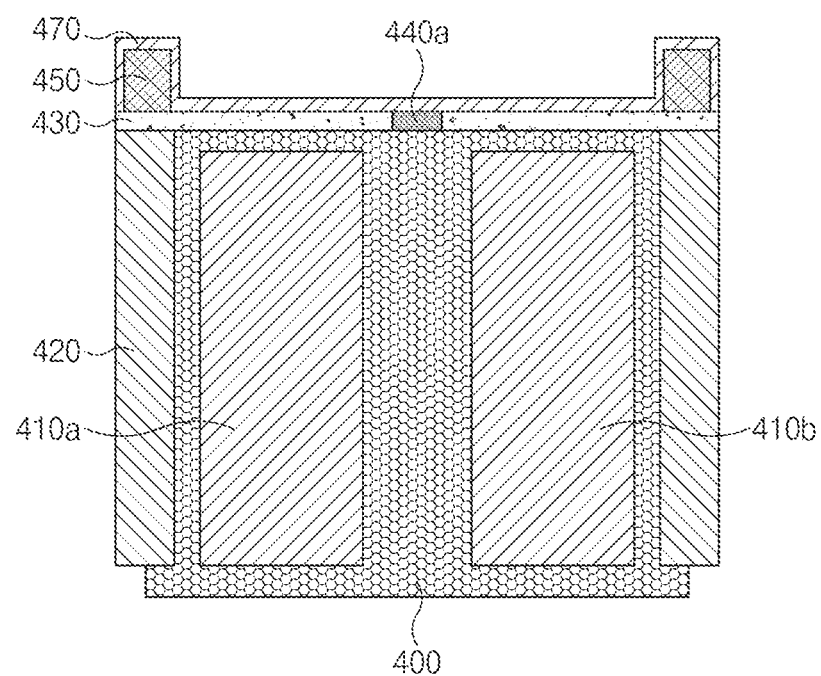

Referring to FIG. 5E, a plasma process may be carried out upon the resultant structure of FIG. 5D, such that the sacrificial layer 440s may be removed and the light guide unit 440a may be formed at the position from which the sacrificial layer 440s is removed.

In this case, the plasma process may be carried out using gas (e.g., $O_2$, $N_2$, $H_2$, CO, $CO_2$, or $CH_4$) including at least one of oxygen, nitrogen, and hydrogen.

When gas such as oxygen, nitrogen, hydrogen, or the like is in a plasma state, a material having an active group called radicals may be generated. The generated material having an active group (hereinafter referred to as an active material) may be introduced into the sacrificial layer 440s after passing through the second anti-reflection layer 470.

The introduced active material may combine with carbons included in the sacrificial layer 440s to generate gas, and the generated gas may be discharged outside through the second anti-reflection layer 470. Through the above process, the sacrificial layer 440s may be removed, and the light guide unit 440a including the air layer may be formed at the position from which the sacrificial layer is removed.

In some other implementations, when the pre-grid layer 450a includes a spin-on carbon (SOC) layer, the grid layer 450 may include an air layer by a plasma process.

Figure 5F:
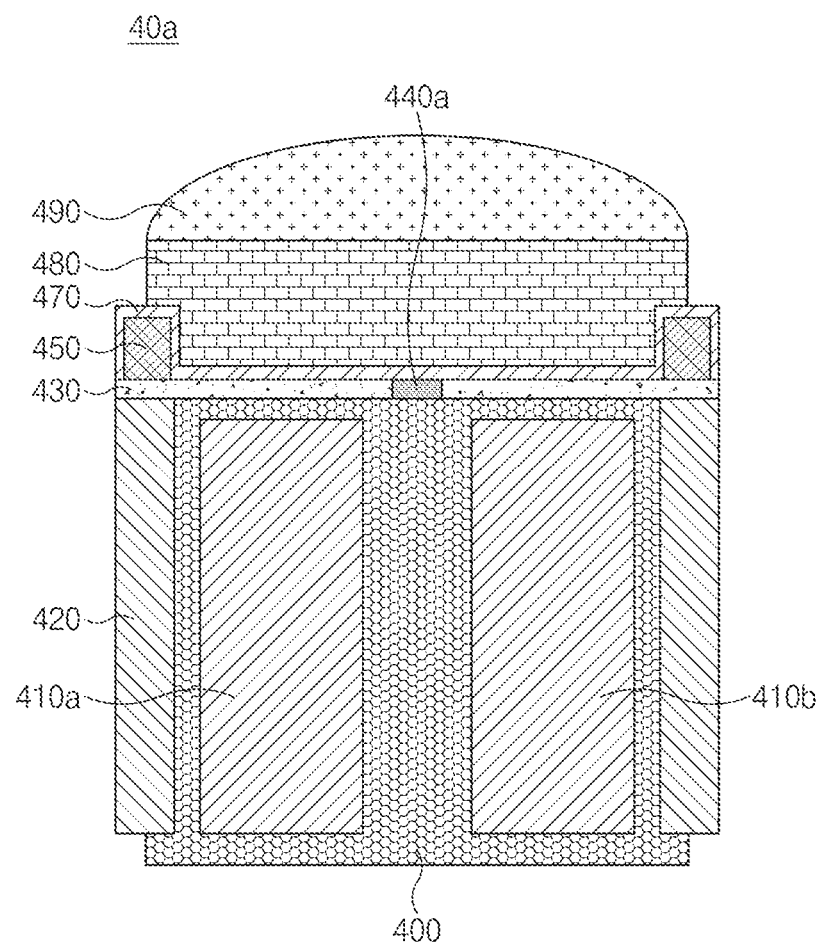

Referring to FIG. 5F, an embodiment in which the optical filter layer 480 and the microlens 490 are formed on the second anti-reflection layer 470 is illustrated as an example. Through the above process, an image sensing device including the light guide unit 440a can be manufactured.

As is apparent from the above description, the image sensing device based on some implementations of the disclosed technology includes a light guide unit for dividing incident light into a plurality of light beams to be transferred to a plurality of photoelectric conversion elements, thereby increasing the accuracy of an autofocus function.

The image sensing device based on some implementations of the disclosed technology is configured to include a light guide unit through a simple process, such that the image sensing device can reduce light reception efficiency deterioration caused by the isolation structure while increasing the manufacturing efficiency thereof.

The embodiments of the disclosed technology may provide a variety of effects capable of being directly or indirectly recognized through the above-mentioned patent document.

Those skilled in the art will appreciate that the disclosed technology may be carried out in other specific ways than those set forth herein. In addition, claims that are not explicitly presented in the appended claims may be presented in combination as an embodiment or included as a new claim by a subsequent amendment after the application is filed.

Although a number of illustrative embodiments have been described, it should be understood that modifications and/or enhancements to the disclosed embodiments and other embodiments can be devised based on what is described and/or illustrated in this patent document.

What is claimed is:

1. An image sensing device comprising:
   a plurality of photoelectric conversion elements included in a unit pixel and located in a substrate layer, each of the plurality of photoelectric conversion elements configured to receive incident light and generate an electrical signal corresponding to the received incident light;
   an isolation structure disposed along an edge of the unit pixel and configured to isolate the plurality of photoelectric conversion elements from photoelectric conversion elements included in another unit pixel adjacent to the unit pixel;
   a first anti-reflection layer configured to overlap the plurality of photoelectric conversion elements and disposed to be in contact with one surface of the substrate layer;
   a light guide disposed between the plurality of photoelectric conversion elements and disposed to be in contact with one surface of the substrate layer and the first anti-reflection layer;
   a grid layer configured to overlap the isolation structure; and
   a second anti-reflection layer disposed to be in contact with the first anti-reflection layer, the light guide, and the grid layer,
   wherein the light guide includes a material having a refractive index smaller than a refractive index of the first anti-reflection layer, and
   wherein the grid layer includes a plurality of layers having different refractive indices from one another.

2. The image sensing device according to claim 1, wherein:
   the refractive index of the light guide is less than or equal to the refractive index of the grid layer.

3. The image sensing device according to claim 1, wherein:
   the material includes air.

4. The image sensing device according to claim 1, further comprising:
   an optical filter layer disposed over the second anti-reflection layer.

5. The image sensing device according to claim 4, further comprising:
   a microlens disposed over the optical filter layer.

6. The image sensing device according to claim 5, wherein:
   the microlens is configured to overlap two photoelectric conversion elements.

7. The image sensing device according to claim 5, wherein:
   the microlens is configured to overlap four photoelectric conversion elements.

8. The image sensing device according to claim 4, wherein:
   the light guide is configured to extend from one surface of the substrate layer to the optical filter layer.

9. The image sensing device according to claim 1, wherein:
   the isolation structure is disposed under the first anti-reflection layer without being disposed under the light guide.

10. The image sensing device according to claim 1, wherein:
    the light guide includes a plurality of layers having different refractive indices from one another.

11. The image sensing device according to claim 10, wherein the light guide includes:
    a first guide layer disposed to be in contact with the substrate layer in which the plurality of photoelectric conversion elements are located; and
    a second guide layer disposed over the first guide layer and formed to be in contact with the second anti-reflection layer.

12. The image sensing device according to claim 11, wherein:
    the first guide layer is configured to have a higher refractive index than a refractive index of the second guide layer.

13. The image sensing device according to claim 11, wherein:
    the second guide layer includes a material having a lower refractive index than the refractive index of the first anti-reflection layer.

14. The image sensing device according to claim 1, wherein:
    the light guide includes one surface contacting the substrate layer in which the plurality of photoelectric conversion elements is located,
    wherein an area of the one surface has a size different from a size of an area of another surface facing or opposite to the one surface.

15. An image sensing device comprising:
    a first photoelectric conversion element and a second photoelectric conversion element disposed in a substrate layer and included in a unit pixel, the first and second photoelectric conversion elements configured to receive light incident on the unit pixel and generate an electrical signal corresponding to an incident light;
    an isolation structure disposed at an outside of the first and second photoelectric conversion elements and configured to isolate the first and second photoelectric conversion elements from photoelectric conversion elements included in another unit pixel adjacent to the unit pixel;
    an anti-reflection layer disposed at a surface of the substrate layer; and
    a light guide disposed in at least a partial area of the anti-reflection layer and vertically overlapping the substrate layer between the first photoelectric conversion element and the second conversion element,
    wherein the light guide includes a material having a refractive index smaller than a refractive index of the anti-reflection layer.

16. The image sensing device according to claim 15, further comprising:
    an optical filter layer disposed over the anti-reflection layer and included in the unit pixel; and a grid layer disposed between the optical filter layer of the unit pixel and an optical filter layer of the another unit pixel.

17. The image sensing device according to claim 15, wherein:
the material includes air.

18. The image sensing device according to claim 15, wherein the light guide has a shape protruding from a surface of the anti-reflection layer.

19. The image sensing device according to claim 16, wherein the material has the refractive index smaller than a refractive index of the optical filter layer that is greater than a refractive index of the grid layer.

* * * * *